(12) United States Patent
Wang

(10) Patent No.: US 11,698,097 B2
(45) Date of Patent: Jul. 11, 2023

(54) METHOD OF FITTING FASTENER TO OBJECT

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD., New Taipei (TW)

( * ) Notice: Subject to any disclaimer, the term of this patent is extended or adjusted under 35 U.S.C. 154(b) by 104 days.

(21) Appl. No.: 17/169,528

(22) Filed: Feb. 7, 2021

(65) Prior Publication Data

US 2021/0207642 A1 Jul. 8, 2021

Related U.S. Application Data

(63) Continuation-in-part of application No. 16/735,725, filed on Jan. 7, 2020.

(51) Int. Cl.
*B23K 1/00* (2006.01)
*F16B 39/02* (2006.01)
*F16B 37/06* (2006.01)
*F16B 1/02* (2006.01)
*B23K 31/02* (2006.01)

(52) U.S. Cl.
CPC ............ *F16B 39/02* (2013.01); *B23K 1/0008* (2013.01); *B23K 31/02* (2013.01); *F16B 1/02* (2013.01); *F16B 37/061* (2013.01)

(58) Field of Classification Search
CPC .......... F16B 39/02; F16B 1/02; F16B 37/061; B23K 1/00–206; B23K 31/02

USPC ................................................... 228/245–254
See application file for complete search history.

(56) References Cited

U.S. PATENT DOCUMENTS

| | | | | |
|---|---|---|---|---|
| 2,950,379 | A * | 8/1960 | Dash | B23K 9/208 219/99 |
| 4,620,079 | A * | 10/1986 | Allmann | B23K 9/206 219/98 |
| 4,657,626 | A * | 4/1987 | Cearlock | B29C 66/8322 53/329.2 |
| 4,887,853 | A * | 12/1989 | Flowers | F16L 19/02 29/523 |
| 5,054,980 | A * | 10/1991 | Bidefeld | F16B 5/08 411/258 |
| 5,384,445 | A * | 1/1995 | Nakagami | B23K 9/20 219/98 |

(Continued)

FOREIGN PATENT DOCUMENTS

| | | |
|---|---|---|
| CN | 106855074 A | 6/2017 |
| DE | 3149513 A1 * | 6/1983 |

(Continued)

*Primary Examiner* — Kiley S Stoner

(57) ABSTRACT

A method of fitting a fastener to an object is introduced. The fastener has a weldable surface and an engaging portion or a hole portion. One end of the hole portion or one end of the engaging portion has a holding portion. During a welding heating process, solder flows into or enters the holding portion and then cools down and solidifies therein so as to be held therein. Therefore, the weldable surface and the holding portion together enable the fastener to be firmly coupled to an object. The engaging portion and the hole portion together enable an object to be coupled to or removed from another object, so as to couple together and separate at least two objects repeatedly and quickly.

6 Claims, 17 Drawing Sheets

(56) References Cited

U.S. PATENT DOCUMENTS

| | | | | |
|---|---|---|---|---|
| 5,549,237 | A * | 8/1996 | Oeftering | C04B 37/006 228/208 |
| 5,688,414 | A * | 11/1997 | Kondo | B23K 9/205 219/98 |
| 6,067,839 | A * | 5/2000 | Xie | B25B 27/0014 29/243.526 |
| 6,327,766 | B1 * | 12/2001 | Cardente | B23P 6/00 29/402.09 |
| 6,702,535 | B1 * | 3/2004 | Stevenson | B23K 20/129 411/21 |
| 7,357,547 | B2 * | 4/2008 | King | F16B 37/061 362/546 |
| 7,726,542 | B2 * | 6/2010 | Kleber | B23K 33/006 228/114.5 |
| 2002/0048498 | A1 * | 4/2002 | Bartels | F16B 33/008 411/171 |
| 2002/0074379 | A1 * | 6/2002 | Kim | B23K 3/08 228/49.5 |
| 2004/0050826 | A1 * | 3/2004 | Citrich | B23K 9/206 219/98 |
| 2004/0245220 | A1 * | 12/2004 | Mauer | B23K 9/206 219/98 |
| 2005/0178816 | A1 * | 8/2005 | Stevenson | B23K 20/127 228/2.1 |
| 2006/0291974 | A1 * | 12/2006 | McGee | B25B 27/0014 411/171 |
| 2007/0067975 | A1 * | 3/2007 | Gerhardt | B23P 19/001 29/714 |
| 2008/0093420 | A1 * | 4/2008 | Mauer | B23K 20/12 228/114 |
| 2008/0290615 | A1 * | 11/2008 | Mauer | B23K 20/1295 279/156 |
| 2010/0003104 | A1 | 1/2010 | Wang et al. | |
| 2010/0226731 | A1 * | 9/2010 | Hsieh | H05K 3/341 411/171 |
| 2011/0033260 | A1 * | 2/2011 | Miura | B23K 35/0288 219/98 |
| 2011/0121054 | A1 * | 5/2011 | Chiu | B23K 1/18 228/44.3 |
| 2011/0194913 | A1 * | 8/2011 | Lewis | F16B 37/044 411/432 |
| 2012/0139193 | A1 * | 6/2012 | Schug | B23K 9/206 279/43.1 |
| 2014/0057731 | A1 | 2/2014 | Stephens et al. | |
| 2015/0143686 | A1 * | 5/2015 | Blacket | F16D 57/002 29/243.526 |
| 2015/0183046 | A1 * | 7/2015 | Kim | B23K 11/0053 219/98 |
| 2016/0332215 | A1 * | 11/2016 | Blacket | F16B 5/08 |
| 2017/0057005 | A1 * | 3/2017 | Wisniewski | B29C 66/7392 |
| 2017/0157696 | A1 * | 6/2017 | Kurzmaier | F16B 37/061 |
| 2018/0154426 | A1 * | 6/2018 | Xiao | B23K 20/22 |
| 2018/0185904 | A1 * | 7/2018 | Jang | B21J 15/08 |
| 2019/0039119 | A1 * | 2/2019 | Li | B21J 15/025 |
| 2019/0291202 | A1 * | 9/2019 | Maeda | B23K 11/115 |
| 2020/0324363 | A1 * | 10/2020 | Abke | B23K 20/122 |

FOREIGN PATENT DOCUMENTS

| | | | | |
|---|---|---|---|---|
| EP | 0580391 | A1 * | 1/1994 | |
| FR | 2784723 | A1 * | 4/2000 | B23K 11/14 |
| JP | 55094778 | A * | 7/1980 | |
| JP | 03180270 | A * | 8/1991 | |
| JP | 2012101283 | A * | 5/2012 | B23K 20/1295 |
| KR | 20170132001 | A | 12/2017 | |
| TW | 201736738 | A | 10/2017 | |

* cited by examiner

16

(a)  (b)  (c)

METHOD OF FITTING FASTENER TO OBJECT

CROSS-REFERENCE TO RELATED APPLICATION

This application is a continuation-in-part patent application of U.S. application Ser. No. 16/735,725 filed on Jan. 7, 2020, the entire contents of which are hereby incorporated by reference for which priority is claimed under 35 U.S.C. § 120.

BACKGROUND OF THE INVENTION

1. Field of the Invention

The present disclosure relates to methods of fitting a fastener to an object and, more particularly, to a method of fitting a fastener to an object, so as to couple together and separate at least two objects repeatedly and quickly.

2. Description of the Related Art

Conventionally, coupling together at least two objects requires fastening the at least two objects together with screws.

Although the aforesaid prior art is effective in coupling together at least two objects to render them inseparable, the at least two objects thus coupled together are not firmly fitted together.

Therefore, it is necessary to provide a method of fitting a fastener to an object, so as to couple together and separate at least two objects repeatedly and quickly.

BRIEF SUMMARY OF THE INVENTION

An objective of the present disclosure is to provide a method of fitting a fastener to an object, so as to couple together and separate at least two objects repeatedly and quickly.

To achieve at least the above objective, the present disclosure provides a method of fitting a fastener to an object, the fastener having a weldable surface and an engaging portion or a hole portion, the method comprising the steps of: providing a tool for gripping the fastener; moving the fastener to a predetermined height above a fitting position of the object with the tool; and causing the tool to release or loosen its grip on the fastener, thereby positioning the fastener at the fitting position of the object.

The present disclosure further provides a method of fitting a fastener to an object. The fastener has a weldable surface and an engaging portion or a hole portion. The method comprises the steps of: providing a tool for gripping the fastener; moving the fastener to the fitting position of the object with the tool; and causing the tool to press the fastener downward against the object and then release or loosen its grip on the fastener, thereby positioning the fastener at the fitting position of the object.

The present disclosure further provides a method of fitting a fastener to an object. The fastener has a weldable surface and an engaging portion or a hole portion. The method comprises the steps of: providing a tool for gripping the fastener; moving the fastener to the fitting position of the object with the tool; and causing the tool to press resiliently the fastener downward against the object and then release or loosen its grip on the fastener, thereby positioning the fastener at the fitting position of the object.

The present disclosure further provides a method of fitting a fastener to an object. The fastener has a weldable surface and an engaging portion or a hole portion. The method comprises the steps of: providing a tool for gripping the fastener; moving the fastener to the fitting position of the object with the tool; and causing the tool to sense a feedback message indicative of the fastener having come into contact with the object and then release or loosen its grip on the fastener, thereby positioning the fastener at the fitting position of the object.

Regarding the method, an end of the hole portion or an end of the engaging portion has a holding portion, such that liquid-state solder flows into or enters the holding portion during a welding heating process, thereby allowing the liquid-state solder in the holding portion to cool and solidify.

Regarding the method, the holding portion is in the shape of a step, slope, arcuate surface, curved surface, slot, dent or hole.

Regarding the method, the engaging portion is a thread, internal thread, external thread, outer engaging member, inner engaging member, hole member or slot member.

Regarding the method, the engaging portion or the hole portion is a penetrating hole or a non-penetrating hole.

Regarding the method, the engaging portion or the hole portion engages with a second object, or the engaging portion or the hole portion is engaged to the second object.

Regarding the method, the fastener is carried with a carrier, taken out thereof with a tool, and positioned on a first object to undergo welding.

Regarding the method, the fastener is carried with a carrier and then taken out thereof with a tool, wherein a comparison device compares the fastener with a first object in terms of position, sends a position message to the tool, and causes the fastener to be positioned at a welding position of the first object with the tool.

Regarding the method, having an interposer, the fastener is carried with a carrier, taken out thereof with a tool through the interposer, and positioned on a first object to undergo welding.

Regarding the method, having an interposer, the fastener is carried with a carrier and then taken out thereof with a tool through the interposer, wherein a comparison device compares the fastener with a first object in terms of position, sends a position message to the tool, and causes the fastener to be positioned at a welding position of the first object with the tool.

Regarding the method, the tool is a clamping component, evacuating device or magnetic attracting device.

Regarding the method, the carrier has a lid.

Regarding the method, the comparison device is an image comparison device, vision comparison device, distance comparison device or space comparison device.

Regarding the method, the fastener is adapted to be welded to a first object, and the first object has a corresponding weldable surface, wherein solder between the weldable surface and the corresponding weldable surface turns into liquid state when heated up, such that the liquid-state solder flows into the holding portion, thereby allowing the liquid-state solder in the holding portion to cool and solidify.

Regarding the method, the holding portion, where the liquid-state solder flows into, solidifies and thus is held, prevents the solder which turns into liquid state when heated up from flowing into the hole portion or the engaging portion and then cooling and solidifying, such that the solidified solder is unlikely to fall off, because it is impossible for interference or impacts to happen when a second object engages with or enters the hole portion or the engaging portion.

Regarding the method, the fastener has a joining portion, wherein the holding portion and the joining portion have a weldable surface, or the fastener is fully enclosed by a weldable surface.

Regarding the method, the fastener has a joining portion, the joining portion has a weldable surface, and the joining portion is adapted to be welded to a first object.

Regarding the method, the joining portion is a step portion, raised portion, dented portion, plane portion, arcuate surface portion or curved surface portion.

Regarding the method, the joining portion is adapted to be welded to a penetrating hole of the first object from inside, to a penetrating hole of the first object from outside, or to a flat surface at one end of the first object.

Regarding the method, the fastener is adapted to be welded to a first object, and the first object is a printed circuit board (PCB), metal board or plastic board.

Regarding the method, the interposer is an engaging member.

Regarding the method, the engaging member is a thread engaging member, columnar engaging member, outer engaging member, inner engaging member, hook engaging member or resilient engaging member.

Regarding the method, the second object is an engaging member.

Regarding the method, the second object is a thread engaging member, columnar engaging member, outer engaging member, inner engaging member, hook engaging member or resilient engaging member.

Regarding the method, the interposer is an engaging member, an adhering member or an inserting member.

Regarding the method, a solder layer or weldable layer, intended to be heated and then cooled to solidify, is disposed between the weldable surface of the fastener and the corresponding weldable surface of the first object.

Regarding the method, the fastener has a joining portion, and the joining portion has a stopping element which stops liquid-state solder from entering or flowing into the engaging portion or the hole portion.

Regarding the method, the fastener has a rotation-preventing portion, and the object has a corresponding rotation-preventing portion, such that the rotation-preventing portion prevents rotation of the corresponding rotation-preventing portion and vice versa.

Regarding the method, a solder layer, intended to be heated and then cooled to solidify, is disposed between the rotation-preventing portion and the corresponding rotation-preventing portion.

Regarding the method, after the solder has cooled down to fit the fastener to the object firmly, the stopping element is removed with a tool to restore a joining function of the engaging portion or the hole portion.

Regarding the method, the fastener has a joining portion, and the joining portion is joined to a corresponding tightening element for clamping the object.

Regarding the method, the fastener has a joining portion, and a solder layer, intended to be heated and then cooled to solidify, is disposed between the joining portion and a penetrating hole of the object or between the fastener and the object.

Regarding the method, having an interposer, the fastener is taken out with a tool through the interposer and then positioned on a first object to undergo welding, wherein the interposer is an engaging member, sheet member, patch member, adhering member, inserting member, thread engaging member, outer engaging member, inner engaging member or columnar member.

Regarding the method, having an interposer, the fastener is taken out with a tool through the interposer and then positioned on a first object to undergo welding, wherein the interposer is another engaging member movably fitted to the fastener.

Regarding the method, the fastener has another engaging member adapted to be movably joined to the engaging member.

Regarding the method, the carrier has a lid.

To achieve at least the above objective, the present disclosure provides a method of fitting a fastener to an object, wherein a weldable surface and a holding portion together enable the fastener to be firmly coupled to the first object, wherein an engaging portion and a hole portion together enable the first object to be coupled to or removed from the second object, so as to couple together and separate at least two objects repeatedly and quickly.

DETAILED DESCRIPTION OF THE INVENTION

To facilitate understanding of the object, characteristics and effects of this present disclosure, embodiments together with the attached drawings for the detailed description of the present disclosure are provided.

Figure 1:
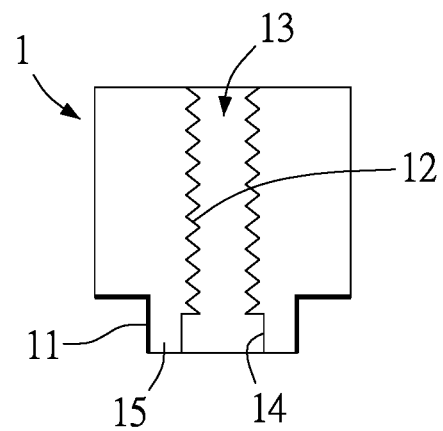
FIG. 1 is schematic cross-sectional view of the first embodiment of the present disclosure.
Figure 2:
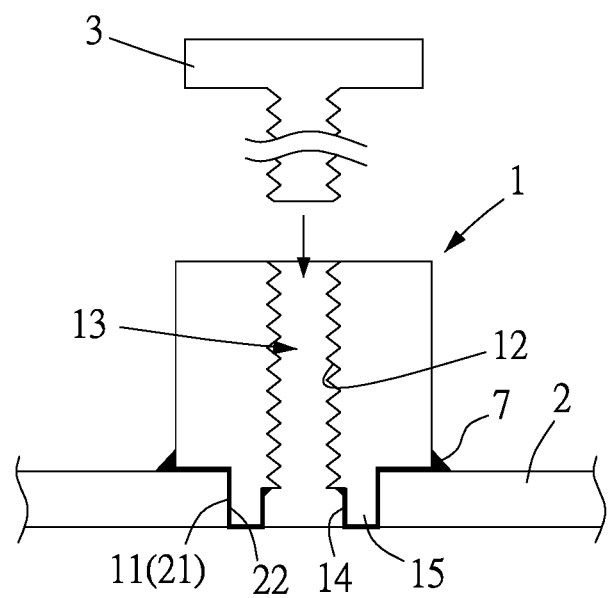
FIG. 2 is schematic view of the first embodiment of the present disclosure.

Referring to FIG. 1 and FIG. 2, the present disclosure provides a method of fitting a fastener 1 to an object. The fastener 1 has a weldable surface 11 and an engaging portion 12 and a hole portion 13. One end of the hole portion 13 or one end of the engaging portion 12 has a holding portion 14. During a welding heating process, molten solder flows into the holding portion 14. Then, the solder in the holding portion 14 cools and thus turns into solid-state solder 7 so as to be held in the holding portion 14.

The fitting process begins by welding the fastener 1 to a first object 2. The first object 2 has a corresponding weldable surface 21. During the heating process, the solder between the weldable surface 11 and the corresponding weldable surface 21 turns into liquid state, such that the liquid-state solder flows into the holding portion 14. Then, the liquid-state solder in the holding portion 14 cools and thus turns into the solid-state solder 7 so as to be held in the holding portion 14. After that, the engaging portion 12 or the hole portion 13 engages with a second object 3, or the engaging portion 12 and the hole portion 13 are engaged to the second object 3. Thus, with the holding portion 14 being adapted to receive the liquid-state solder and then hold the solid-state solder 7, the liquid-state solder does not flow into the hole portion 13 or the engaging portion 12, cool and solidify. Thus, the solidified solder is unlikely to fall off, because it is impossible for interference or impacts to happen when the second object 3 engages with or enters the hole portion 13 or the engaging portion 12. Therefore, the weldable surface 11 and the holding portion 14 together enable the fastener 1 to be firmly coupled to the first object 2, whereas the engaging portion 12 and the hole portion 13 together enable the first object 2 to be coupled to or removed from the second object 3, so as to couple together and separate at least two objects repeatedly and quickly.

In a preferred embodiment of the present disclosure, the fastener 1 has a joining portion 15. The joining portion 15 has a weldable surface 11. The joining portion 15 and the weldable surface 11 together enable the fastener 1 to be welded to the first object 2. Both the holding portion 14 and the joining portion 15 have a weldable surface, or the fastener 1 is fully enclosed by a weldable surface (not shown), thereby allowing the present disclosure to meet different usage needs.

In a preferred embodiment of the present disclosure, the joining portion 15 is adapted to be welded to a penetrating hole 22 of the first object 2 from inside or from outside, so as to be welded to a flat surface at one end of the first object 2. According to the present disclosure, the joining portion 15 is adapted to be welded to the penetrating hole 22 of the first object 2, such that the fastener 1 is firmly coupled to the first object 2.

In a preferred embodiment of the present disclosure, the engaging portion 12 is a thread (for example, internal thread or external thread, preferably internal thread in this embodiment). The engaging portion 12 may also be a hole member or slot member (not shown). The hole portion 13 is a penetrating hole. The holding portion 14 and the joining portion 15 are step portions. Therefore, the fastener 1 engages with the second object 3 through the engaging portion 12 and the hole portion 13.

In a preferred embodiment of the present disclosure, the fastener 1 is adapted to be welded to the first object 2, and the first object 2 is a printed circuit board (PCB), metal board or plastic board. Therefore, according to the present disclosure, the fastener 1 is applicable to various first object 2, thereby allowing the present disclosure to meet practical fitting-related needs.

Figure 3:
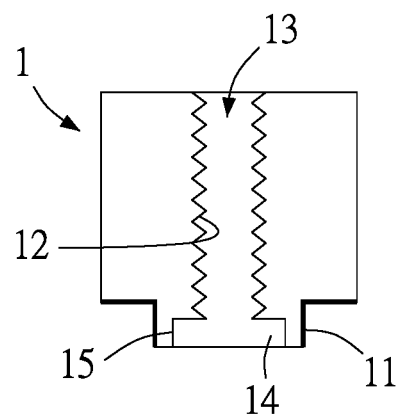
FIG. 3 is schematic cross-sectional view of the second embodiment of the present disclosure.
Figure 4:
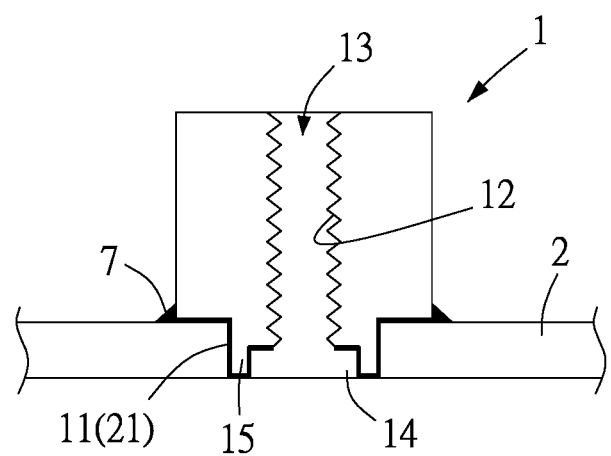
FIG. 4 is schematic view of the second embodiment of the present disclosure.

Referring to FIG. 3 and FIG. 4, in a preferred embodiment of the present disclosure, the engaging portion 12 is a thread (for example, internal thread or external thread, preferably internal thread in this embodiment). The hole portion 13 is a penetrating hole. The holding portion 14 is in the shape of a slope, and the joining portion 15 is a step portion. Therefore, the fastener 1 is adapted to be welded to the first object 2. Solder between the weldable surface 11 and the corresponding weldable surface 21 turns into liquid state when heated up. The liquid-state solder flows into the holding portion 14 which is in the shape of a slope, such that the liquid-state solder cools and thus turns into the solid-state solder 7 so as to be held in the holding portion 14. Then, the engaging portion 12 or the hole portion 13 engages with a second object (not shown), or the engaging portion 12 and the hole portion 13 are engaged to the second object. Therefore, the fastener 1 can be provided in various forms in order to be applicable to the first object 2 and the second object, thereby allowing the present disclosure to meet different usage needs.

Figure 5:
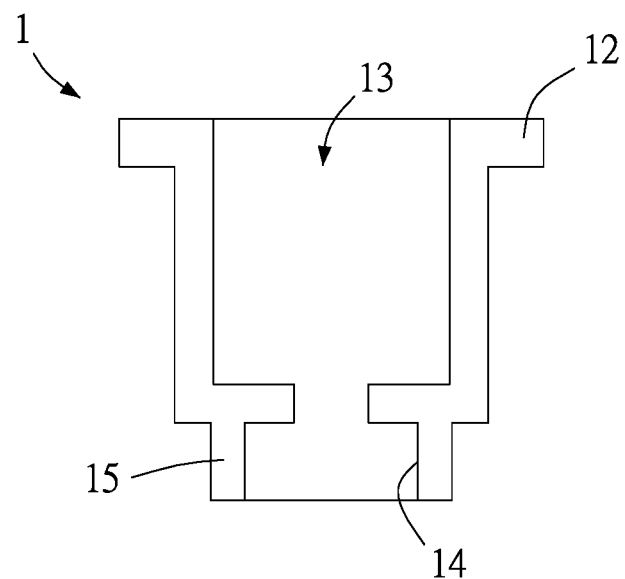
FIG. 5 is schematic cross-sectional view of the third embodiment of the present disclosure.

Referring to FIG. 5, in a preferred embodiment of the present disclosure, the engaging portion 12 of the fastener 1 is an outer engaging member, whereas the hole portion 13 of the fastener 1 is a penetrating hole. The holding portion 14 and the joining portion 15 are step portions. Therefore, the fastener 1 is provided in different forms and coupled to the first object (not shown), and both the engaging portion 12 and the hole portion 13 engage with the second object (not shown), thereby allowing the present disclosure to meet different usage needs.

Figure 6:
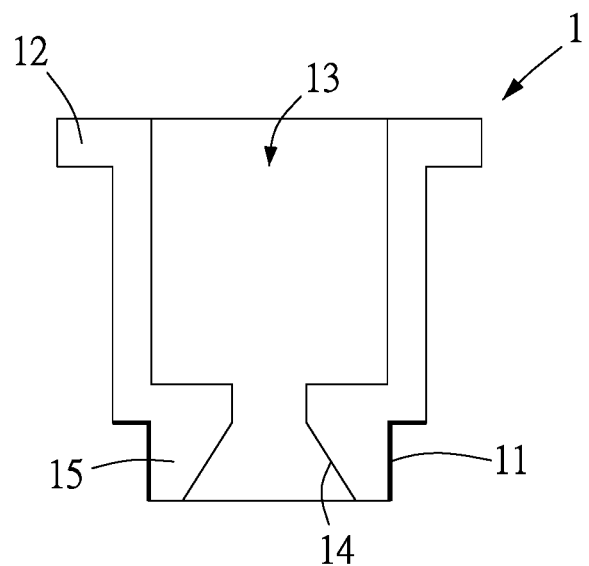
FIG. 6 is schematic cross-sectional view of the fourth embodiment of the present disclosure.
Figure 7:
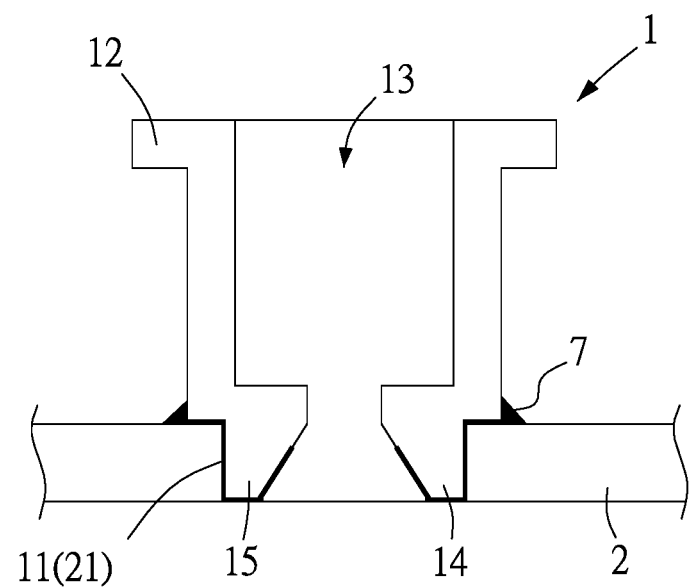
FIG. 7 is schematic view of the fourth embodiment of the present disclosure.

Referring to FIG. 6 and FIG. 7, in a preferred embodiment of the present disclosure, the engaging portion 12 is an outer engaging member, the hole portion 13 is a penetrating hole, the holding portion 14 is in the shape of a slope, and the joining portion 15 is a step portion. Therefore, the fastener 1 is adapted to be welded to the first object 2. Solder between the weldable surface 11 and the corresponding weldable surface 21 turns into liquid-state solder when heated up. The liquid-state solder flows into the holding portion 14 which is in the shape of a slope, such that the liquid-state solder cools and thus turns into the solid-state solder 7 so as to be held in the holding portion 14. Then, the engaging portion 12 or the hole portion 13 engages with a second object (not shown), or the engaging portion 12 and the hole portion 13 are engaged to the second object. Therefore, the fastener 1 can be provided in various forms in order to be applicable to the first object 2 and the second object, thereby allowing the present disclosure to meet different usage needs.

Figure 8:
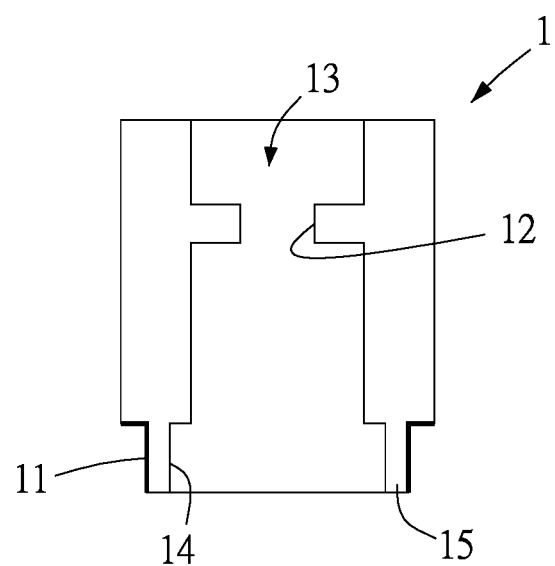
FIG. 8 is schematic cross-sectional view of the fifth embodiment of the present disclosure.
Figure 9:
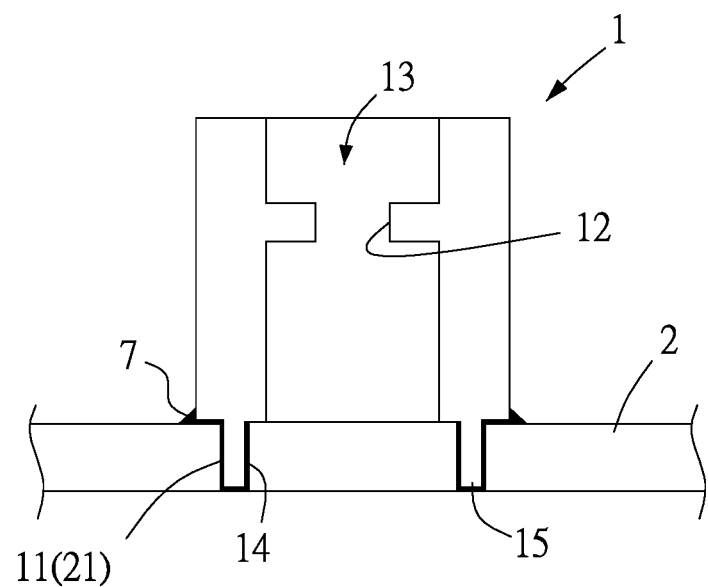
FIG. 9 is schematic view of the fifth embodiment of the present disclosure.

Referring to FIG. 8 and FIG. 9, in a preferred embodiment of the present disclosure, the engaging portion 12 is an inner engaging member. The hole portion 13 is a penetrating hole. The holding portion 14 and the joining portion 15 are step portions. Therefore, the fastener 1 is adapted to be welded to the first object 2. Solder between the weldable surface 11 and the corresponding weldable surface 21 turns into liquid-state solder when heated up. The liquid-state solder flows into the holding portion 14 which is a step portion, such that the liquid-state solder cools and thus turns into the solid-state solder 7 so as to be held in the holding portion 14. Then, the engaging portion 12 or the hole portion 13 engages with a second object (not shown), or the engaging portion 12 and the hole portion 13 are engaged to the second object. Therefore, the fastener 1 can be provided in various forms in order to be applicable to the first object 2 and the second object, thereby allowing the present disclosure to meet different usage needs.

Figure 10:
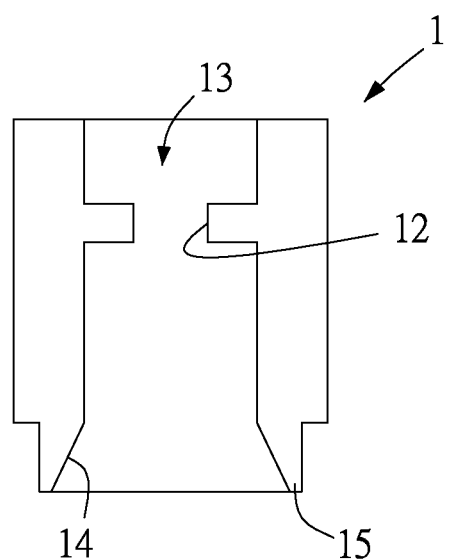
FIG. 10 is schematic cross-sectional view of the sixth embodiment of the present disclosure.

Referring to FIG. 10, in a preferred embodiment of the present disclosure, the engaging portion 12 is an inner engaging member. The hole portion 13 is a penetrating hole. The holding portion 14 is in the shape of a slope, and the joining portion 15 is a step portion. Therefore, the fastener 1 can be provided in various forms in order to be coupled to the first object (not shown), whereas the engaging portion 12 and the hole portion 13 engage with the second object (not shown), thereby allowing the present disclosure to meet different usage needs.

Figure 11:
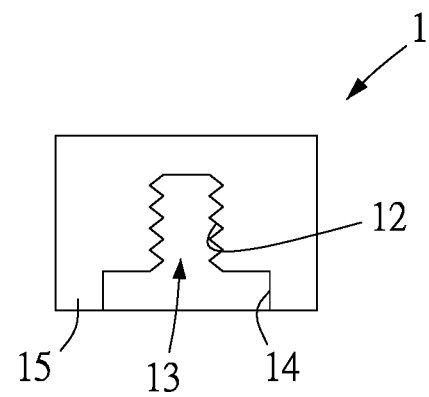
FIG. 11 is schematic cross-sectional view of the seventh embodiment of the present disclosure.

Referring to FIG. 11, in a preferred embodiment of the present disclosure, the engaging portion 12 is a thread (for example, internal thread or external thread, preferably internal thread in this embodiment). The hole portion 13 is a non-penetrating hole. The holding portion 14 is a step portion. The joining portion 15 is a plane portion. Therefore, the fastener 1 can be provided in various forms in order to be coupled to the first object (not shown), whereas the engaging portion 12 and the hole portion 13 engage with the second object (not shown), thereby allowing the present disclosure to meet different usage needs.

Figure 12:
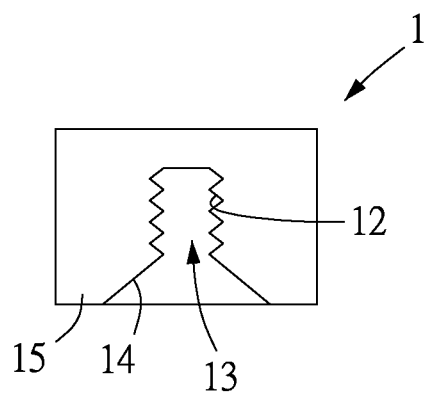
FIG. 12 is schematic cross-sectional view of the eighth embodiment of the present disclosure.

Referring to FIG. 12, in a preferred embodiment of the present disclosure, the engaging portion 12 is a thread (for example, internal thread or external thread, preferably internal thread in this embodiment). The hole portion 13 is a non-penetrating hole. The holding portion 14 is in the shape of a slope, and the joining portion 15 is a plane portion. Therefore, the fastener 1 can be provided in various forms in order to be coupled to the first object (not shown), whereas the engaging portion 12 and the hole portion 13 engage with the second object (not shown), thereby allowing the present disclosure to meet different usage needs.

Figure 13:
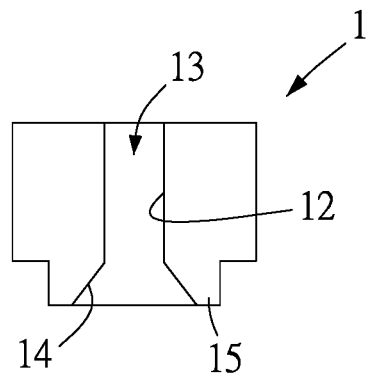
FIG. 13 is schematic cross-sectional view of the ninth embodiment of the present disclosure.

Referring to FIG. 13, in a preferred embodiment of the present disclosure, the engaging portion 12 and the hole portion 13 are penetrating holes in communication with each other. The holding portion 14 is in the shape of a slope, and the joining portion 15 is a step portion. Therefore, the fastener 1 can be provided in various forms in order to be coupled to the first object (not shown), whereas the engaging portion 12 and the hole portion 13 engage with the second object (not shown), thereby allowing the present disclosure to meet different usage needs.

Figure 14:
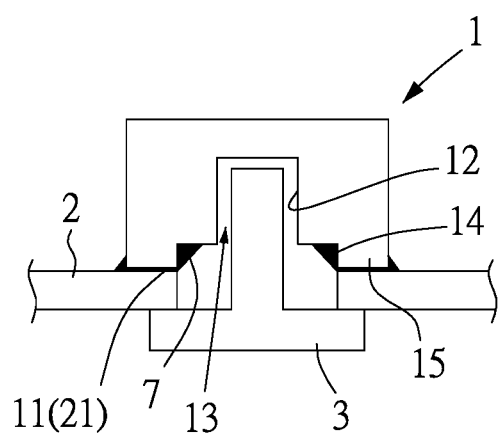
FIG. 14 is schematic view of the tenth embodiment of the present disclosure.

Referring to FIG. 14, in a preferred embodiment of the present disclosure, the engaging portion 12 is an inner engaging member. The hole portion 13 is a non-penetrating hole. The holding portion 14 is a step portion. The joining portion 15 is a plane portion. Therefore, the fastener 1 is adapted to be welded to the first object 2. Solder between the weldable surface 11 and the corresponding weldable surface 21 turns into liquid-state solder when heated up. The liquid-state solder flows into the holding portion 14 which is a step portion, such that the liquid-state solder cools and thus turns into the solid-state solder 7 so as to be held in the holding portion 14. Then, the engaging portion 12 and the hole portion 13 engage with the second object 3, or the engaging portion 12 and the hole portion 13 are engaged to the second object 3. Therefore, the fastener 1 can be provided in various forms in order to be applicable to the first object 2 and the second object 3, thereby allowing the present disclosure to meet different usage needs.

Figure 15:
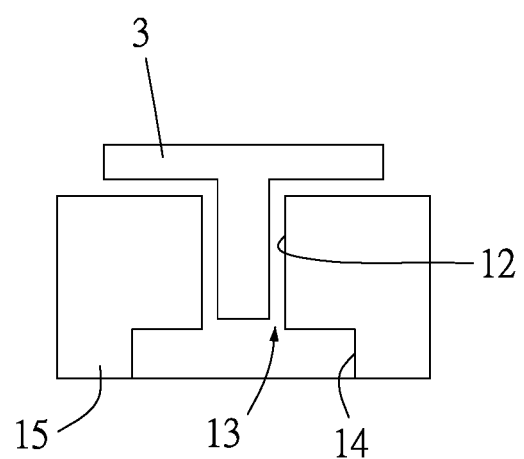
FIG. 15 is schematic view of the eleventh embodiment of the present disclosure.

Referring to FIG. 15, in a preferred embodiment of the present disclosure, the engaging portion 12 and the hole portion 13 are two penetrating holes in communication with each other. The holding portion 14 is a step portion. The joining portion 15 is a plane portion. Therefore, the fastener 1 is adapted to be welded to the first object (not shown), and then the engaging portion 12 and the hole portion 13 engage with the second object 3, or the engaging portion 12 and the hole portion 13 are engaged to the second object 3. Therefore, the fastener 1 can be provided in various forms in order to be applicable to the first object and the second object 3, thereby allowing the present disclosure to meet different usage needs.

Alternatively, the holding portion 14 is an arcuate surface, curved surface, slot, dent or hole, whereas the joining portion 15 is a raised portion, dented portion, arcuate surface portion or curved surface portion (not shown). Therefore, the present disclosure meets different usage needs.

Figure 16:
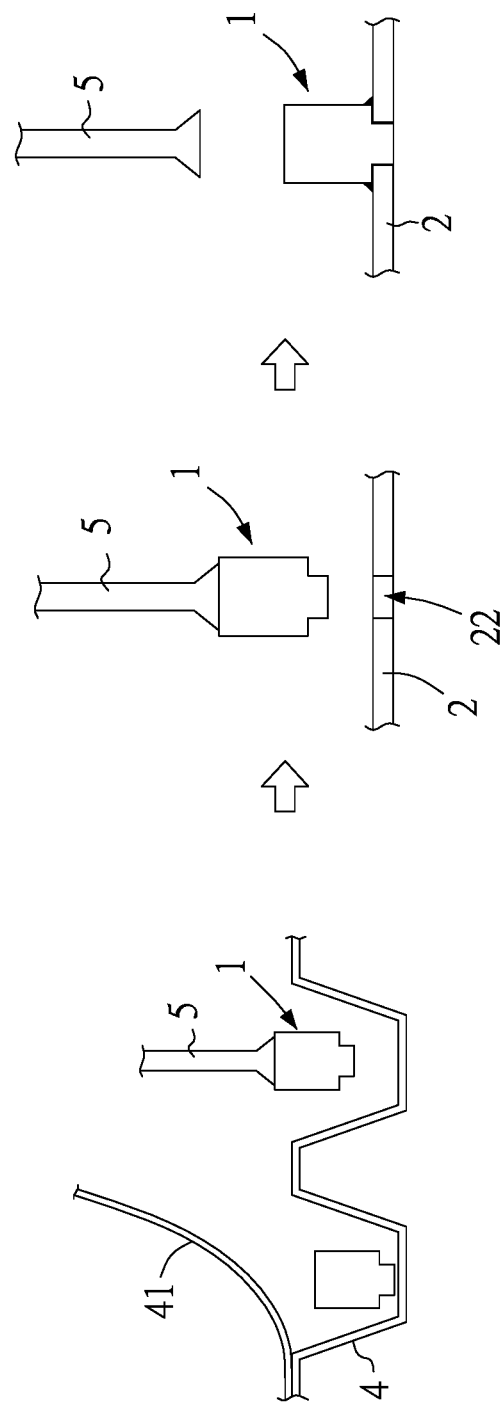
FIG. 16 is schematic view of the twelfth embodiment of the present disclosure.

Referring to FIG. 16, in a preferred embodiment of the present disclosure, the fastener 1 is carried with a carrier 4 and taken out thereof with a tool 5; then, the fastener 1 is positioned at the penetrating hole 22 of the first object 2 to undergo welding.

In a preferred embodiment of the present disclosure, the carrier 4 has a lid 41. The lid 41 hides the fastener 1 in the carrier 4.

In a preferred embodiment of the present disclosure, the tool 5 is a clamping component, evacuating device or magnetic attracting device. Therefore, the tool 5 is appropriately selected in accordance with usage needs, thereby allowing the present disclosure to meet practical fitting-related needs.

Figure 17:
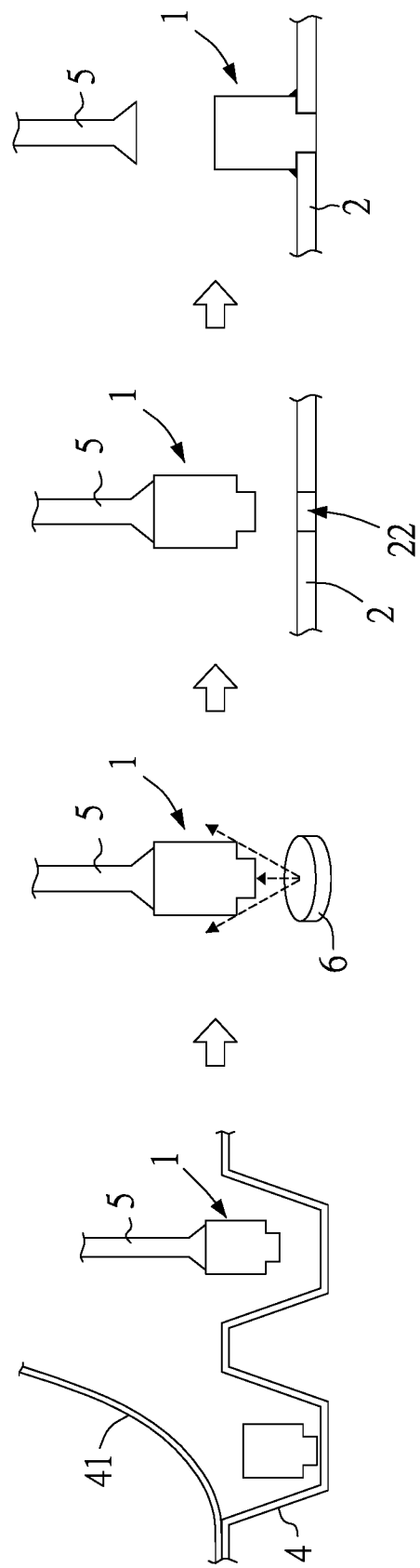
FIG. 17 is schematic view of the thirteenth embodiment of the present disclosure.

Referring to FIG. 17, in a preferred embodiment of the present disclosure, the fastener is carried with a carrier 4 and taken out thereof with a tool 5; then, a comparison device 6 compares the fastener 1 with the first object 2 in terms of position and sends a position message to the tool 5, thereby allowing the fastener 1 to be precisely positioned at a welding position (for example, the penetrating hole 22 shown in the diagram) of the first object 2 with the tool 5.

In a preferred embodiment of the present disclosure, the comparison device 6 is an image comparison device, vision comparison device, distance comparison device or space comparison device. Therefore, the comparison device 6 is selected as needed to meet practical usage needs.

Figure 18:
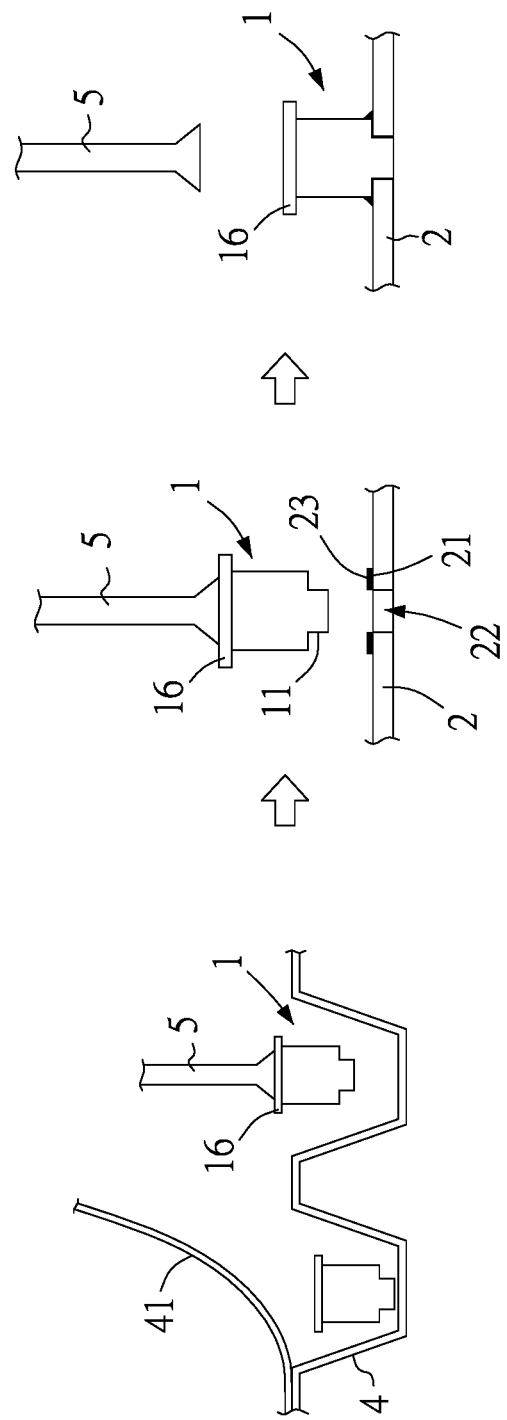
FIG. 18 is schematic view of the fourteenth embodiment of the present disclosure.

Referring to FIG. 18, in a preferred embodiment of the present disclosure, the fastener 1 has an interposer 16. The fastener 1 is carried with a carrier 4 and taken out thereof with a tool 5 through the interposer 16; then, the fastener 1 is positioned at the penetrating hole 22 of the first object 2 to undergo welding.

In a preferred embodiment of the present disclosure, a solder layer 23 (or weldable layer), intended to be heated and then cooled to solidify, is disposed between the weldable surface 11 of the fastener 1 and the corresponding weldable surface 21 of the first object 2, such that the weldable surface 11 of the fastener 1 and the corresponding weldable surface 21 of the first object 2 can be welded together by the solder layer 23.

Figure 19:
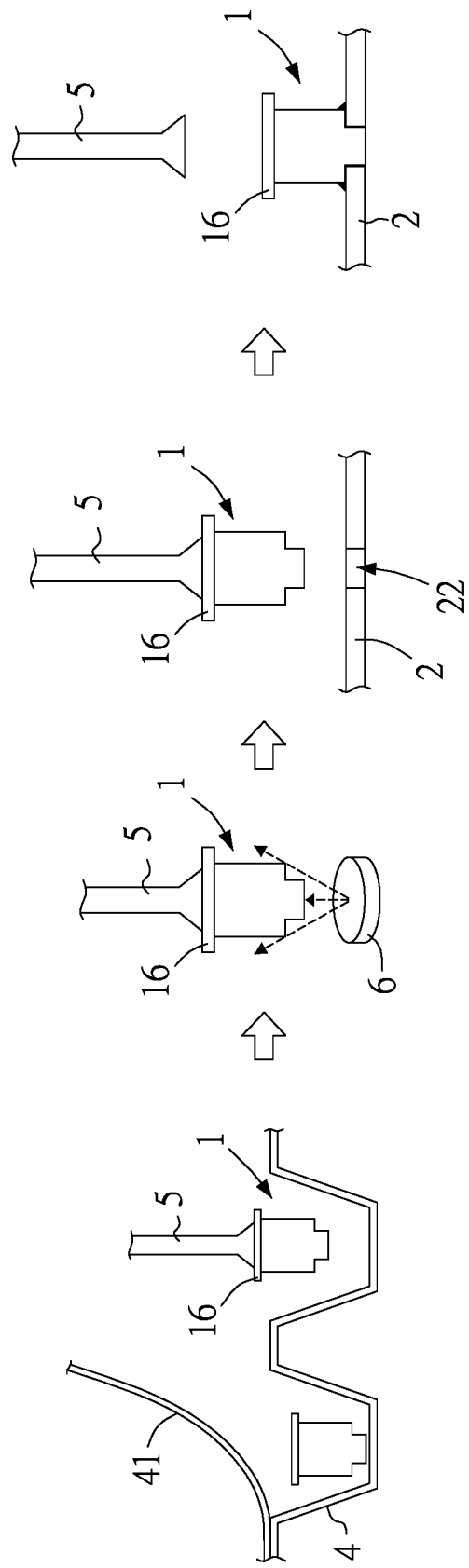
FIG. 19 is schematic view of the fifteenth embodiment of the present disclosure.

Referring to FIG. 19, in a preferred embodiment of the present disclosure, the fastener 1 has an interposer 16. The fastener 1 is carried with a carrier 4 and taken out thereof with a tool 5 through the interposer 16. Then, a comparison device 6 compares the fastener with the first object 2 in terms of position and sends a position message to the tool 5, thereby allowing the fastener 1 to be precisely positioned at a welding position (for example, the penetrating hole 22 shown in the diagram) of the first object 2 with the tool 5.

Figure 20:
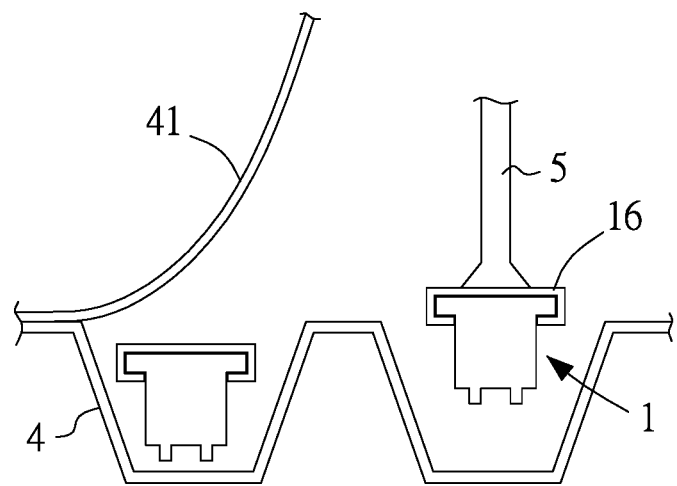
FIG. 20 is schematic view of the sixteenth embodiment of the present disclosure.

Referring to FIG. 20, in a preferred embodiment of the present disclosure, the interposer 16 is a second object, and the interposer 16 is a hook engaging member which movably engages with the engaging portion 12. The fastener 1 is carried with a carrier 4 and taken out thereof with a tool 5 through the interposer 16; then, the fastener 1 is positioned at the first object (not shown) to undergo welding.

Figure 21:
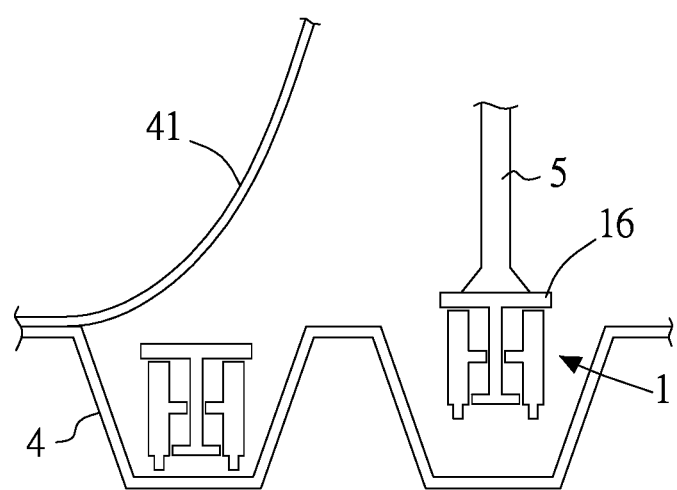
FIG. 21 is schematic view of the seventeenth embodiment of the present disclosure.

Referring to FIG. 21, in a preferred embodiment of the present disclosure, the interposer 16 is a second object. Alternatively, the interposer 16 is another engaging member movably fitted to the fastener 1, for example, an outer engaging member. The fastener 1 is carried with a carrier 4. After being taken out of the carrier 4 with a tool 5 through the interposer 16, the fastener 1 is positioned on the first object (not shown) to undergo welding.

Figure 22:
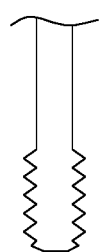
FIG. 22 is schematic view of an interposed layer in various forms according to the present disclosure.
Figure 22:
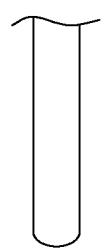
Figure 22:
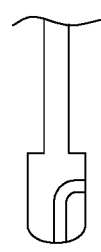

Referring to FIG. 22, in a preferred embodiment of the present disclosure, the interposer 16 is an engaging member, an adhering member or an inserting member. In addition to being a hook engaging member or outer engaging member, the interposer 16 is a thread engaging member (part a in the diagram), columnar engaging member (part b in the diagram), inner engaging member (part c in the diagram) or resilient engaging member (not shown) when provided in the form of the engaging member. Therefore, the interposer 16 meets practical usage needs.

Figure 23:
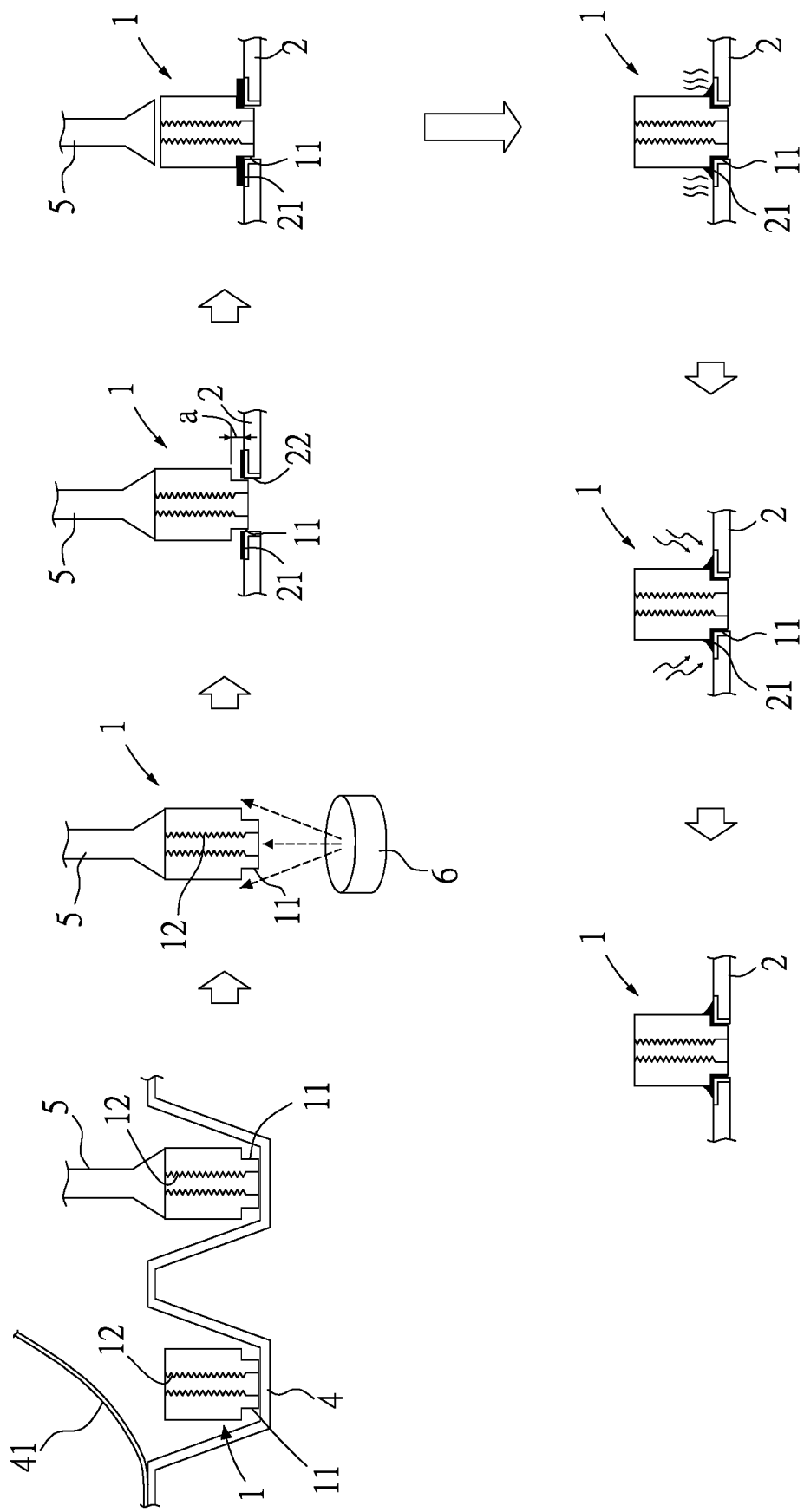
FIG. 23 is schematic view of the eighteenth embodiment of the present disclosure.

Referring to FIG. 23, in a preferred embodiment of the present disclosure, the present disclosure further provides a method of fitting a fastener 1 to an object. The fastener 1 has a weldable surface 11, an engaging portion 12 and a hole portion 13. The method comprises the steps of:

providing a tool 5 for gripping the fastener 1;
moving the fastener 1 to a predetermined height a above a fitting position (i.e., penetrating hole 22) of the first object 2 with the tool 5; and
causing the tool 5 to release or loosen its grip on the fastener 1, thereby allowing the fastener 1 to descend and land on the fitting position of the first object 2.

Thus, the fastener 1 is fixed to the first object 2 to enhance the efficiency of subsequent processes.

In an embodiment of the present disclosure, the fastener 1 is disposed in a carrier 4. The fastener 1 is taken out of the carrier 4 with a tool 5, and then a comparison device 6 compares the fastener 1 with the corresponding weldable surface 21 at the fitting position 20 of the first object 2 in terms of position or distance. Thus, the tool 5 moves the fastener 1 to a predetermined height a (from 0.000001 mm to 10 mm) above the corresponding weldable surface 21 of the first object 2 according to the comparison message of the comparison device 6 and then releases or loosens its grip on the fastener 1, such that the fastener 1 descends and lands on the corresponding weldable surface 21 at the fitting position 20 of the first object 2. After that, the weldable surface 11 of the fastener 1 and the corresponding weldable surface 21 of the first object 2 are heated up and welded together, allowing the fastener 1 to be welded to the first object 2. The first object 2 is a PCB, and a penetrating hole 22 is disposed at the fitting position of the first object 2. The fastener 1 is disposed in the penetrating hole 22.

In an embodiment of the present disclosure, the method comprises the steps of: providing a comparison device 6 for comparing the fastener 1 with the first object 2 in terms of its fitting position or fitting distance after the tool 5 has gripped the fastener 1; moving the fastener 1 to the predetermined height a above the fitting position of the object with the tool 5 according to a comparison message of the comparison device 6; and causing the tool 5 to release or loosen its grip on the fastener 1, such that the fastener 1 descends and lands on the fitting position of the first object 2.

In an embodiment of the present disclosure, the method comprises the steps of: providing, after the tool 5 has gripped the fastener 1, a comparison device 6 for comparing the fastener 1 with a corresponding weldable surface 21 at the fitting position of the first object 2 in terms of position or distance; moving the fastener 1 to the predetermined height a above the corresponding weldable surface 21 of the first object 2 with the tool 5 according to a comparison message of the comparison device 6; and causing the tool 5 to release or loosen its grip on the fastener 1, such that the fastener 1 descends and lands on the corresponding weldable surface 21 of the first object 2.

In an embodiment of the present disclosure, the tool 5 is a clamping component, engaging component, evacuating device, magnetic attracting device or resilient motion component, thereby allowing the present disclosure to meet practical fitting-related needs.

In an embodiment of the present disclosure, the comparison device 6 is a vision comparison device, distance comparison device, image comparison device, AI comparison device or photograph comparison device, thereby allowing the present disclosure to meet practical fitting-related needs.

Figure 24:
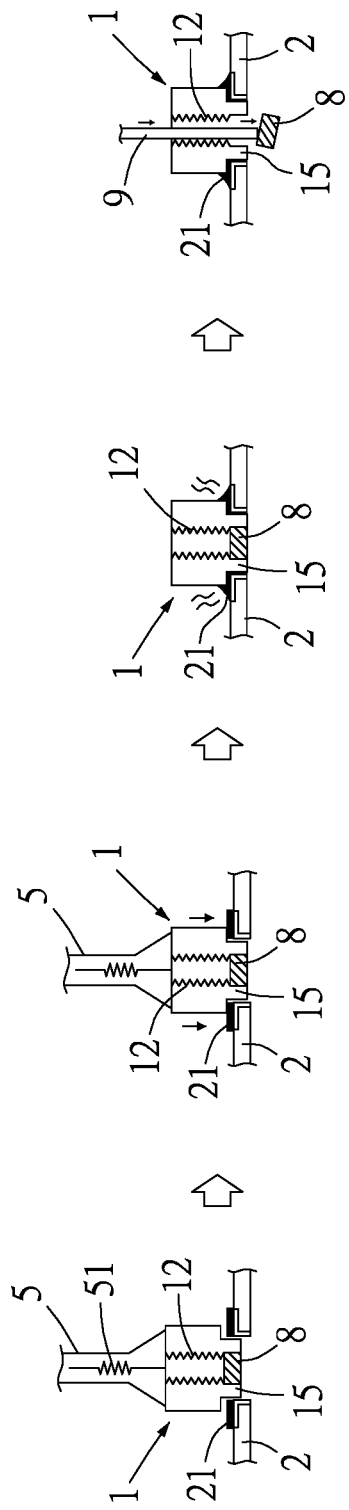
FIG. 24 is schematic view of the nineteenth embodiment of the present disclosure.

Referring to FIG. 24, in a preferred embodiment of the present disclosure, the present disclosure further provides a method of fitting a fastener 1 to an object. The fastener 1 has a weldable surface 11, an engaging portion 12 and a hole portion 13. The method comprises the steps of: providing a tool 5 for gripping the fastener 1; moving the fastener 1 to a fitting position of the first object 2 with the tool 5; and causing the tool 5 to sense a feedback message indicative of the fastener 1 having come into contact with the first object 2 and then release or loosen its grip on the fastener 1, such that the fastener 1 is positioned at the fitting position of the first object 2, thereby allowing the fastener 1 to be welded to the weldable surface 21 of the first object 2.

The tool 5 has a sensing member 51 (for example, a resilient sensing member). After the tool 5 has moved the fastener 1 to the fitting position of the first object 2 and the sensing member 51 of the tool 5 has sensed a feedback message indicative of the fastener 1 having come into contact with the first object 2, the tool 5 releases or loosens its grip on the fastener 1, such that the fastener 1 is positioned at the fitting position of the first object 2, thereby allowing the present disclosure to meet practical fitting-related needs.

In an embodiment of the present disclosure, after the fastener 1 has come into contact with the first object 2, electrical conduction therebetween comes into play. The sensing member 51 senses the electrical conduction and thus generates a feedback message. The feedback message causes the tool 5 to release or loosen its grip on the fastener 1.

In an embodiment of the present disclosure, when the fastener 1 is fitted to the first object 2 as described above, the joining portion 15 has a stopping element 8. The stopping element 8 stops the liquid-state solder on the weldable surface 21 from entering or flowing into the engaging portion 12 (or the hole portion 13). After the solder has cooled down to thereby fit the fastener 1 to the first object 2 firmly, the stopping element 8 is removed from the joining portion 15 with a tool 9 to thereby restore the joining function of the engaging portion 12 (or the hole portion 13).

Regarding the method of fitting the fastener 1 to an object according to the present disclosure, the tool 5 grips the fastener 1, such that the tool 5 moves the fastener 1 to the fitting position of the first object 2, and the tool 5 presses the fastener 1 downward against the first object 2, thereby allowing the tool 5 to release or loosen its grip on the fastener 1. Thus, the fastener 1 is positioned at the fitting position of the first object 2, thereby allowing the present disclosure to meet practical fitting-related needs.

Regarding the method of fitting the fastener 1 to an object according to the present disclosure, the tool 5 grips the fastener 1, such that the tool 5 moves the fastener 1 to a fitting position of the first object 2 and presses resiliently the fastener 1 downward against the first object 2, thereby causing the tool 5 to release or loosen its grip on the fastener 1. Thus, the fastener 1 is positioned at the fitting position of the first object 2, thereby allowing the present disclosure to meet practical fitting-related needs.

Figure 25:
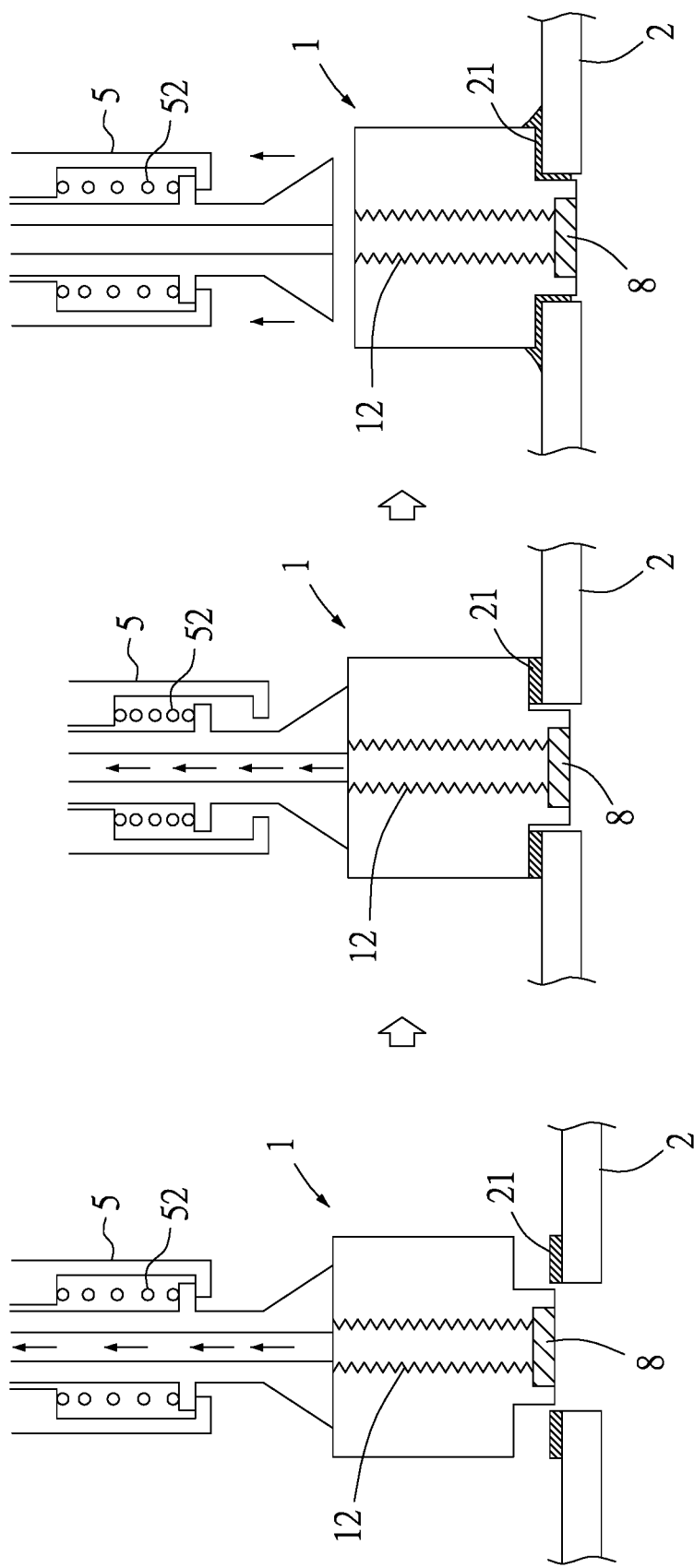
FIG. 25 is schematic view of the twentieth embodiment of the present disclosure.

Referring to FIG. 25, in a preferred embodiment of the present disclosure, a resilient component 52 disposed in the tool 5 enables the tool 5 to grip the fastener 1 under the evacuating force of the tool 5. Thus, the tool 5 moves the fastener 1 to the fitting position of the first object 2, resiliently presses the fastener 1 downward against the first object 2, and compresses the resilient component 52 to therefore terminate the evacuating force and restore the resilient component 52 to its initial position, thereby allowing the tool 5 to release or loosen its grip on the fastener 1 and allowing the fastener 1 to be positioned at the fitting position of the first object 2. After the solder on the weldable surface 21 has cooled down and fitted the fastener 1 to the first object 2 firmly, removal of the stopping element 8 allows the joining function of the engaging portion 12 (or the hole portion 13) to restore, thereby allowing the present disclosure to meet practical fitting-related needs.

Figure 26:
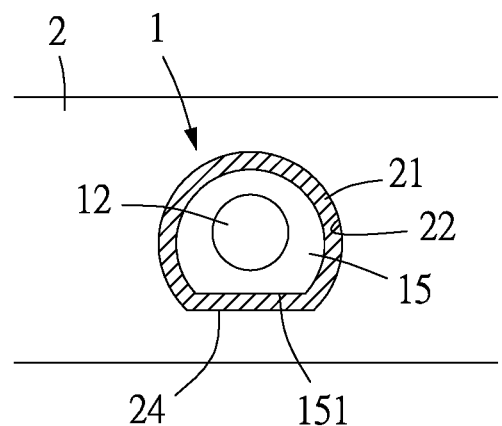
FIG. 26 is schematic view of the twenty-first embodiment of the present disclosure.

Referring to FIG. 26, in a preferred embodiment of the present disclosure, there is a cooled-and-solidified solder layer (i.e., the cooled weldable surface 21) between the joining portion 15 and the penetrating hole 22 of the first object 2 or between the fastener 1 and the first object 2. The joining portion 15 of the fastener 1 has a rotation-preventing portion 151. The first object 2 has a corresponding rotation-preventing portion 24. The rotation-preventing portion 151 prevents the rotation of the corresponding rotation-preventing portion 24 and vice versa. Between the rotation-preventing portion 151 and the corresponding rotation-preventing portion 24 is a solder layer (i.e., the cooled weldable surface 21) conducive to enhancement of the strength of the bonding between the fastener 1 and the first object 2, such that the fastener 1 is joined to the first object 2 firmly.

Figure 27:
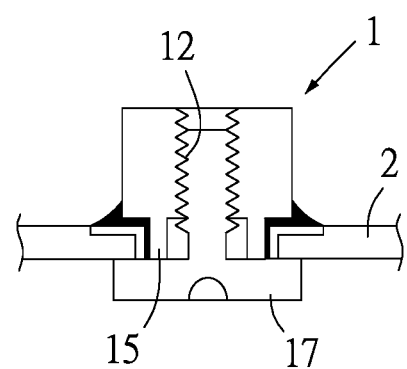
FIG. 27 is schematic view of the twenty-second embodiment of the present disclosure.

Referring to FIG. 27, the joining portion 15 is joined to a corresponding tightening element 17. The corresponding tightening element 17 is coupled to the engaging portion 12 (or the hole portion 13) to clamp the first object 2 and thus enhance the strength of the bonding between the fastener 1 and the object 2, such that the fastener 1 is fitted to the first object 2 firmly.

While the present disclosure has been described by means of specific embodiments, numerous modifications and variations could be made thereto by those skilled in the art without departing from the scope and spirit of the present disclosure set forth in the claims.

What is claimed is:

1. A method of fitting a fastener to an object, the fastener having a solderable surface and an engaging portion or a hole portion, the method comprising the steps of:
   providing a tool for gripping the fastener;
   moving the fastener to a fitting position of the object with the tool; and
   causing the tool to press the fastener downward against the object and then release or loosen its grip on the fastener, thereby positioning the fastener at the fitting position of the object;
   wherein an end of the hole portion or an end of the engaging portion has a holding portion, such that liquid-state solder flows into or enters the holding portion during a solder heating process, thereby allowing the liquid-state solder in the holding portion to cool and solidify; and
   wherein the fastener is adapted to be soldered to a first object, and the first object has a corresponding solderable surface, wherein solder between the solderable surface and the corresponding solderable surface turns into liquid state when heated up, such that the liquid-state solder flows into the holding portion, thereby allowing the liquid-state solder in the holding portion to cool and solidify, a solder layer, intended to be heated and then cooled to solidify, is disposed between the solderable surface of the fastener and the corresponding solderable surface of the first object.

2. The method of claim 1, wherein causing the tool to press resiliently the fastener downward against the object and then release or loosen its grip on the fastener, thereby positioning the fastener at the fitting position of the object.

3. The method of claim 1, wherein causing the tool to press the fastener downward against the object and then causing the tool to sense a feedback message indicative of the fastener having come into contact with the object and then release or loosen its grip on the fastener, thereby positioning the fastener at the fitting position of the object.

4. A method of fitting a fastener to an object, the fastener having a solderable surface and an engaging portion or a hole portion, the method comprising the steps of:
   providing a tool for gripping the fastener;
   moving the fastener to a fitting position of the object with the tool; and
   causing the tool to press the fastener downward against the object and then release or loosen its grip on the fastener, thereby positioning the fastener at the fitting position of the object;
   wherein an end of the hole portion or an end of the engaging portion has a holding portion, such that liquid-state solder flows into or enters the holding portion during a solder heating process, thereby allowing the liquid-state solder in the holding portion to cool and solidify; and
   wherein the holding portion, where the liquid-state solder flows into, solidifies and thus is held, prevents the solder which turns into liquid state when heated up from flowing into the hole portion or the engaging portion and then cooling and solidifying, such that the solidified solder will not fall off, because interference or impacts are prevented from happening when a second object engages with or enters the hole portion or the engaging portion.

5. The method of claim 1, wherein the fastener has a joining portion with a solderable surface, and the joining portion is adapted to be soldered to a first object, the joining portion is adapted to be soldered to a penetrating hole of the first object from inside, to a penetrating hole of the first object from outside, or to a flat surface at an end of the first object.

6. The method of claim 1, wherein the fastener has a joining portion, and the joining portion has a stopping element which stops liquid-state solder from entering or flowing into the engaging portion or the hole portion, after the solder has cooled down to fit the fastener to the object firmly, the stopping element is removed to restore a joining function of the engaging portion or the hole portion, or the stopping element is not removed to stay on the joining portion.

* * * * *

UNITED STATES PATENT AND TRADEMARK OFFICE
CERTIFICATE OF CORRECTION

| | | |
|---|---|---|
| PATENT NO. | : 11,698,097 B2 | Page 1 of 1 |
| APPLICATION NO. | : 17/169528 | |
| DATED | : July 11, 2023 | |
| INVENTOR(S) | : Ting-Jui Wang | |

It is certified that error appears in the above-identified patent and that said Letters Patent is hereby corrected as shown below:

On the Title Page

Item (30) in Column 1, insert Foreign Application Priority Data --TW 108100914 filed on January 09, 2019--

Signed and Sealed this
Nineteenth Day of November, 2024

Katherine Kelly Vidal
*Director of the United States Patent and Trademark Office*